United States Patent
Miyata

(10) Patent No.: US 10,317,192 B2
(45) Date of Patent: Jun. 11, 2019

(54) GEOMETRY MEASUREMENT SYSTEM, GEOMETRY MEASUREMENT APPARATUS, AND GEOMETRY MEASUREMENT METHOD

(71) Applicant: Mitutoyo Corporation, Kawasaki, Kanagawa (JP)

(72) Inventor: Kaoru Miyata, Ibaraki (JP)

(73) Assignee: MITUTOYO CORPORATION, Kawasaki (JP)

( * ) Notice: Subject to any disclaimer, the term of this patent is extended or adjusted under 35 U.S.C. 154(b) by 131 days.

(21) Appl. No.: 15/433,508

(22) Filed: Feb. 15, 2017

(65) Prior Publication Data

US 2017/0241767 A1  Aug. 24, 2017

(30) Foreign Application Priority Data

Feb. 18, 2016  (JP) .................. 2016-028851

(51) Int. Cl.
*G01B 11/00* (2006.01)
*G06K 9/46* (2006.01)
(Continued)

(52) U.S. Cl.
CPC .......... *G01B 11/002* (2013.01); *G06K 9/2036* (2013.01); *G06K 9/4604* (2013.01);
(Continued)

(58) Field of Classification Search
CPC ................ G01B 11/25; G01B 11/2513; G01B 11/2504; G01B 11/2527; G01B 11/24; G01B 11/0608; G01B 11/2545; G01B 11/254; G01B 11/2518; G01B 11/2531; G01B 11/2536; G01B 21/047; G01B 11/00; G01B 11/002; G01B 11/005;
(Continued)

(56) References Cited

U.S. PATENT DOCUMENTS

2014/0168662 A1* 6/2014 Takabayashi ...... G01B 11/2513
                                                                   356/610
2016/0155235 A1* 6/2016 Miyatani .................. G06K 9/036
                                                                   382/103

FOREIGN PATENT DOCUMENTS

JP         2009-094295         4/2009

* cited by examiner

*Primary Examiner* — Zaihan Jiang
*Assistant Examiner* — Samuel D Fereja
(74) *Attorney, Agent, or Firm* — Rankin, Hill & Clark LLP

(57) ABSTRACT

The geometry measurement apparatus includes: an image acquisition part that acquires a plurality of captured images generated by imaging an object to be measured, onto which a plurality of respectively different projection patterns are sequentially projected; a quantization part that generates a quantization value of a luminance value for each pixel in the plurality of captured images by comparing the luminance value with a predetermined reference value; a selection part that selects, based on the relationship between the reference value and the luminance value for a plurality of pixels having the same coordinates in the plurality of captured images, a quantization value to be used for identifying the geometry of the object to be measured, from among a plurality of quantization values corresponding to the plurality of captured images; and a geometry identification part that identifies the geometry of the object to be measured based on the quantization value selected by the selection part.

18 Claims, 9 Drawing Sheets

(51) Int. Cl.
*G06K 9/62* (2006.01)
*G06T 7/73* (2017.01)
*G06K 9/52* (2006.01)
*G06K 9/20* (2006.01)
*G06T 7/521* (2017.01)

(52) U.S. Cl.
CPC ............. *G06K 9/4661* (2013.01); *G06K 9/52* (2013.01); *G06K 9/6215* (2013.01); *G06T 7/521* (2017.01); *G06T 7/73* (2017.01)

(58) Field of Classification Search
CPC ... G01B 11/026; G01B 11/22; G01B 11/2441; G01B 11/245; G01B 11/2509; G01B 11/2522; G06T 7/521; G06T 2207/10152; G06T 7/50; G06T 1/00; G06T 2207/10012; G06T 2207/10016; G06T 2207/10028; G06T 2207/20021; G06T 7/004; G06T 7/55; G06T 7/586; G06T 7/593; G06T 7/70; G06T 1/0014; G06T 2207/10024; G06T 2207/30141; G06T 2207/30152; G06T 2207/30244; G06T 7/0057; G06T 7/11; G06T 7/40; G06T 7/571; G06T 7/60; G06T 7/602; G06T 7/73; G06T 7/74; H04N 5/2256; H04N 5/2353; H04N 7/18; H04N 13/189; H04N 13/20; H04N 13/207; H04N 13/239; H04N 13/254; H04N 13/257; H04N 13/275; H04N 1/00; H04N 2013/0081; H04N 5/2226; H04N 5/23212; H04N 5/23216; H04N 5/23222; H04N 5/238; H04N 9/31; G06K 9/2036; G06K 2209/401; G06K 9/4604; G06K 9/4661; G06K 9/52; G06K 9/00201; G06K 9/20; G06K 9/6215
See application file for complete search history.

| Pattern 1 | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|
| Pattern 2 | 0 | 0 | 0 | 0 | 1 | 1 | 1 | 1 | 1 | 1 | 1 | 1 | 0 | 0 | 0 | 0 |
| Pattern 3 | 0 | 0 | 1 | 1 | 1 | 1 | 0 | 0 | 0 | 0 | 1 | 1 | 1 | 1 | 0 | 0 |
| Pattern 4 | 0 | 1 | 1 | 0 | 0 | 1 | 1 | 0 | 0 | 1 | 1 | 0 | 0 | 1 | 1 | 0 |
| | 0 | 1 | 2 | 3 | 4 | 5 | 6 | 7 | 8 | 9 | 10 | 11 | 12 | 13 | 14 | 15 |

GEOMETRY MEASUREMENT SYSTEM, GEOMETRY MEASUREMENT APPARATUS, AND GEOMETRY MEASUREMENT METHOD

CROSS-REFERENCE TO RELATED APPLICATIONS

The present application claims priority to Japanese Patent Application number 2016-028851, filed on Feb. 18, 2016. The content of this application is incorporated herein by reference in its entirety.

BACKGROUND OF THE INVENTION

Traditionally, methods are known in which a predetermined projection pattern is projected onto an object to be measured, and the geometry thereof is measured, without making contact with the object to be measured, by analyzing a captured image obtained by imaging the object to be measured, onto which a light beam is projected. JP 2009-094295 A discloses a measurement apparatus for measuring a height of an electronic component based on a captured image obtained by imaging an optical cutting line when line light is projected onto the electronic component.

When a projection pattern is projected onto the object to be measured, multiple reflections may occur, which is light reflection among a plurality of surfaces of the object to be measured. When multiple reflections occur, the captured image may include regions having luminance, which is different from the luminance when there are no multiple reflections, and thus, there is a decrease in the accuracy in measuring the geometry of the object to be measured. In order to prevent such problems, measures have been taken, such as application of an anti-multiple-reflection coating material to the surfaces of the object to be measured or making use of a mask for limiting the region of the object to be measured, onto which the projection pattern is projected.

BRIEF SUMMARY OF THE INVENTION

However, the method of applying a coating material to the object to be measured is associated with a problem wherein the geometry of the object to be measured is altered due to the application of the coating material, a problem wherein the number of man-hours for applying the coating material to the object to be measured and for rinsing the coating material is increased, and a problem wherein such a method cannot be used in an environment where a high degree of cleanliness is required. In addition, the method of making use of a mask is associated with a problem wherein a dedicated mask needs to be created for each object to be measured and a problem wherein the measurement time is prolonged since the region that can be measured at one time is limited. Therefore, there has been a need for a new method that curbs the influence of multiple reflections at the time of measuring the geometry of the object to be measured.

Accordingly, the present invention has been made in view of these problems, and an object thereof is to provide a geometry measurement system, a geometry measurement apparatus and a geometry measurement method, which are capable of curbing the influence of multiple reflections at the time of measuring the geometry of the object to be measured.

In a first embodiment of the present invention, there is provided a geometry measurement system comprising: a projection apparatus that projects light of a plurality of respectively different projection patterns onto an object to be measured; an imaging apparatus that generates a plurality of captured images by sequentially imaging the object to be measured while the projection apparatus projects each of the plurality of projection patterns; and a geometry measurement apparatus that measures the geometry of the object to be measured based on the plurality of captured images, wherein the geometry measurement apparatus includes: an image acquisition part that acquires the plurality of captured images; a quantization part that generates a quantization value of a luminance value for each pixel in the plurality of captured images by comparing the luminance value with a predetermined reference value; a selection part that selects, based on the relationship between the reference value and the luminance value for a plurality of pixels having the same coordinates in the plurality of captured images, a pixel whose quantization value is to be used for identifying the geometry of the object to be measured, from among the plurality of pixels; and a geometry identification part that identifies the geometry of the object to be measured based on the quantization value of the pixel selected by the selection part.

In a second embodiment of the present invention, there is provided a geometry measurement apparatus comprising: an image acquisition part that acquires a plurality of captured images generated by imaging an object to be measured, onto which a plurality of respectively different projection patterns are sequentially projected; a quantization part that generates a quantization value of a luminance value for each pixel in the plurality of captured images by comparing the luminance value with a predetermined reference value; a selection part that selects, based on the relationship between the reference value and the luminance value for a plurality of pixels having the same coordinates in the plurality of captured images, a pixel whose quantization value is to be used for identifying the geometry of the object to be measured, from among the plurality of pixels; and a geometry identification part that identifies the geometry of the object to be measured based on the quantization value of the pixel selected by the selection part.

In a third embodiment of the present invention, there is provided a method for geometry identification comprising: a step, performed by a projection apparatus, of projecting light of a plurality of respectively different projection patterns onto an object to be measured; a step, performed by an imaging apparatus, of generating a plurality of captured images by sequentially imaging the object to be measured while each of the plurality of projection patterns is projected; a step, performed by a computer, of acquiring the plurality of captured images; a step, performed by the computer, of generating a quantization value of a luminance value for each pixel in the plurality of captured images by comparing the luminance value with a predetermined reference value; a step, performed by the computer, of selecting, based on the relationship between the reference value and the luminance value for a plurality of pixels having the same coordinates in the plurality of captured images, a pixel, whose quantization value is to be used for identifying the geometry of the object to be measured, from among the plurality of pixels; and a step, performed by the computer, of identifying the geometry of the object to be measured based on the quantization value of the selected pixel.

DETAILED DESCRIPTION OF THE INVENTION

Hereinafter, the present invention will be described by way of embodiments of the present invention; however, the following embodiments are not intended to limit the claimed invention, and not all the combinations of the features described in the embodiments are necessary for the means of solving the problem of the present invention.

First Embodiment

[Outline of Geometry Measurement System S]

Figure 1A:
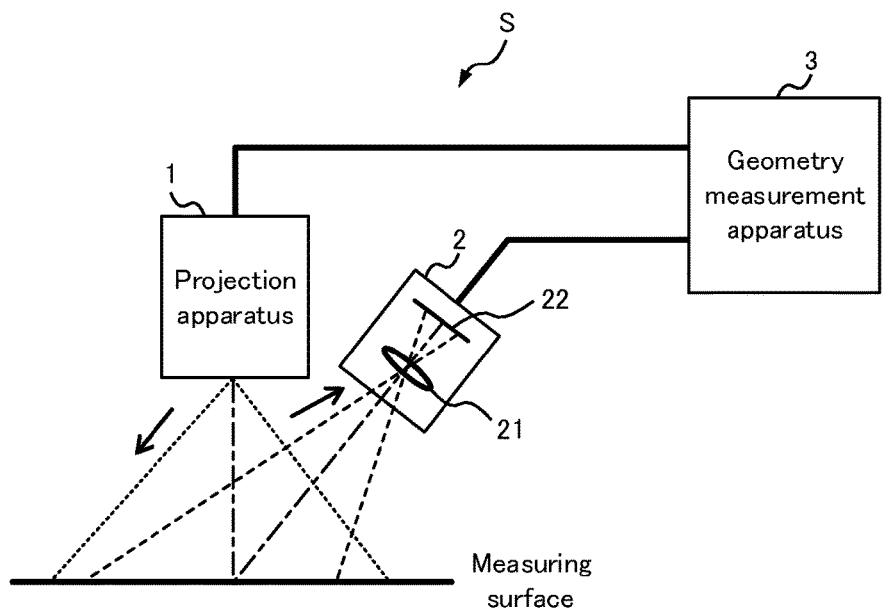
FIG. 1A is a diagram for illustrating the outline of a geometry measurement system S according to a first embodiment.

FIG. 1 contains diagrams for illustrating the outline of the geometry measurement system S according to the first embodiment. FIG. 1A shows the configuration of the geometry measurement system S. The geometry measurement system S includes a projection apparatus 1, an imaging apparatus 2, and a geometry measurement apparatus 3.

The projection apparatus 1 includes a light source, such as a light emitting diode, laser, or the like, and projects a plurality of projection patterns, each projection pattern being different from one another, onto a measuring surface of the object to be measured. The imaging apparatus 2 includes a lens 21 and an imaging element 22, and generates a plurality of captured images by imaging the object to be measured, in a sequential manner, while the projection apparatus 1 projects each of the plurality of the projection patterns. The geometry measurement apparatus 3 measures the geometry of the object to be measured based on the plurality of captured images generated by the imaging apparatus 2. The geometry measurement apparatus 3 may be implemented by, for example, a computer.

Figures 1B, 1C:
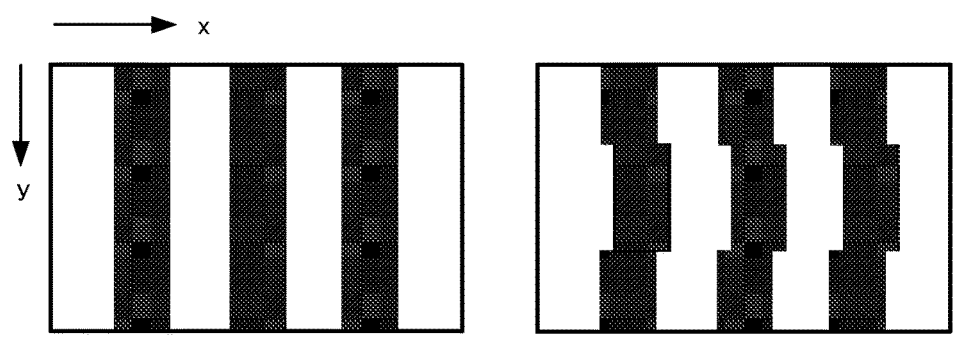
FIG. 1B is a diagram for illustrating the outline of a geometry measurement system S according to a first embodiment.
FIG. 1C is a diagram for illustrating the outline of a geometry measurement system S according to a first embodiment.

FIG. 1B shows a captured image generated by the imaging apparatus 2 when the projection apparatus 1 projects a projection pattern with stripes onto an even measuring surface. The stripes are composed of light-projection regions where light is projected and no-projection regions where light is not projected. The white regions in the captured image represent the light projection regions and the black regions thereof represent the no-projection regions. When the measuring surface has no irregularities, the captured image generated by the imaging apparatus 2 corresponds to the shape of the projection pattern.

FIG. 1C shows a captured image generated by the imaging apparatus 2 when the projection apparatus 1 projects a projection pattern onto a measuring surface having convex portions. In the captured image of FIG. 1C, the image of part of the stripes is deformed. Within the captured image, the projection pattern image deforms by an amount according to the heights of the convex portions. Therefore, the geometry measurement apparatus 3 can measure the geometry of the object to be measured by identifying the height of each location of the convex portion based on the amount of deformation in the projection pattern image in the captured image.

In order to identify the amount of deformation of the projection pattern image within the captured image, the geometry measurement apparatus 3 determines whether the luminance value of each pixel included in the projection pattern image within the captured image is a luminance value in the case where light is illuminated or a luminance value in the case where light is not illuminated. The geometry measurement apparatus 3 determines whether the luminance value of each pixel is a luminance value in the case where light is illuminated or a luminance value in the case where light is not illuminated, by generating quantization values which are classified into groups, the number of which is smaller than the number of gradations of the luminance values, based on the result of a comparison of the luminance value with a reference value.

The geometry measurement apparatus 3 generates the quantization values based on whether the luminance value is equal to or greater than the reference value or less than the reference value. For example, the geometry measurement apparatus 3 may use, as the reference value, an intermediate luminance value between a luminance value of an all-black captured image imaged by the imaging apparatus 2 under circumstances where no light is projected onto the object to be measured and a luminance value of an all-white captured image imaged by the imaging apparatus 2 under circumstances where light is projected onto the entire object to be measured. The quantization value of a pixel having a luminance value equal to or greater than the reference value is set as one (1) and the quantization value of a pixel having a luminance value less than the reference value is set as zero (0). The geometry measurement apparatus 3 can identify the geometry of the object to be measured by making use of the thus-generated quantization values. It should be noted that, in the present specification, the state where light is not projected onto the object to be measured is defined as the state where an all-black pattern is projected and the state where light is projected onto the entire object to be measured is defined as the state where an all-white pattern is projected.

[Regarding Multiple Reflections]

Figure 2A:
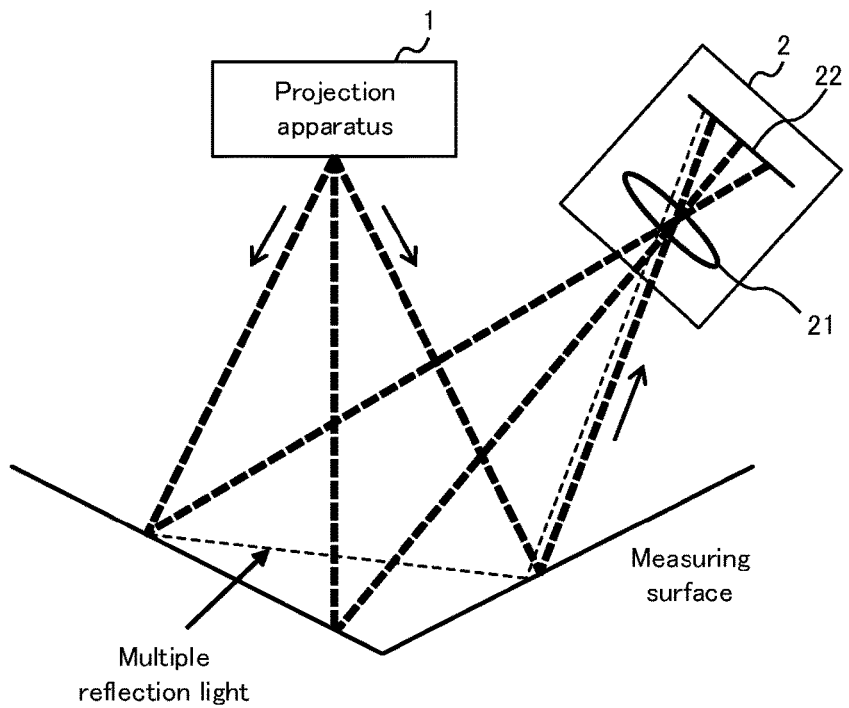
FIG. 2A is a diagram for illustrating the multiple reflections.

By means of the above-described method, the geometry measurement apparatus 3 may measure the geometry of the object to be measured; however, when multiple reflections occur, the measurement accuracy is decreased. Accordingly, a process for suppressing the influence of multiple reflections is required. FIG. 2 contains diagrams for illustrating the multiple reflections. When the object to be measured is glossy and has a complicated shape, light produced by the projection apparatus 1 may enter the imaging apparatus 2 after being repeatedly reflected multiple times on the surface to be measured. In such a case, as shown in FIG. 2A, the light produced by the projection apparatus 1 is incident upon one pixel of the imaging element 22 via two or more paths.

Figure 2B:
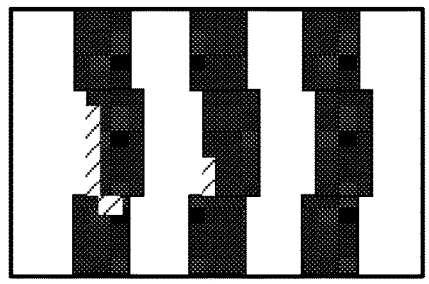
FIG. 2B is a diagram for illustrating the multiple reflections.

Specifically, the light entering the imaging element 22 includes direct light, which is the light produced from the projection apparatus 1 and which directly enters the imaging apparatus 2 after being diffused and reflected on the surface to be measured, and multiple reflection light, which enters the imaging apparatus 2 after being subjected to the multiple reflections. As a result, in the captured image imaged by the imaging apparatus 2, a pixel having a luminance value corresponding to the quantization value of 0 (black) when there is no multiple reflection light may now have a luminance value corresponding to the quantization value of 1 (white). FIG. 2B is a diagram showing an example of a captured image affected by the multiple reflections. FIG. 2B corresponds to FIG. 1C; however, the shaded portions have luminance which differs from that in FIG. 1C due to the influence of multiple reflections.

Since the luminance value of the pixel upon which no direct light or multiple reflection light is incident and the luminance value of the pixel upon which only the direct light is incident are not affected by the multiple reflection light, it is considered that these luminance values are highly reliable. On the other hand, when the multiple reflection light is incident, the reliability of the luminance value is decreased.

Figure 3A:
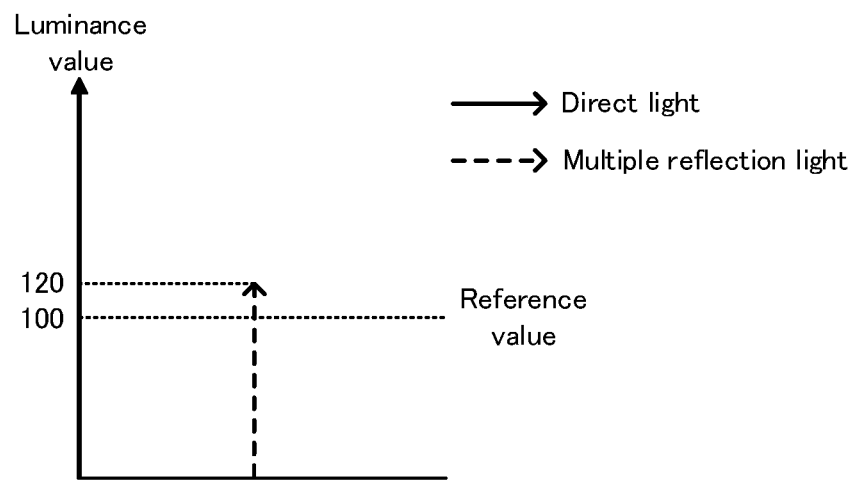
FIG. 3A is a diagram for illustrating the influence on a luminance value due to the incidence of multiple reflection light.

FIG. 3 contains diagrams for illustrating the influence on the luminance value due to the incidence of the multiple reflection light. FIG. 3A shows a case where the multiple reflection light is incident, but the direct light is not incident. In such a case, the original luminance value is 0 and thus, the quantization value is 0; however, the luminance value is 120 due to the influence of the multiple reflection light, and thus the quantization value is erroneously determined to be 1.

Figure 3B:
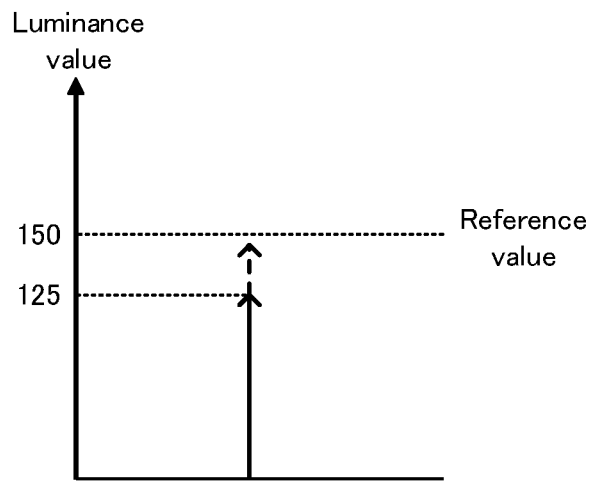
FIG. 3B is a diagram for illustrating the influence on a luminance value due to the incidence of multiple reflection light.

FIG. 3B shows a case where the luminance value when the light is projected wholly so as to determine the reference value becomes larger, due to the influence of the multiple reflection light, than the case where there is no multiple reflection. Under ordinary circumstances, the reference value is 100; however, in FIG. 3B, since the multiple reflection light was present at the time of determining the reference value, the reference value is now 150. In consequence, if the luminance value in the captured image is 125, the quantization value should originally be 1; however, it is erroneously determined to be 0.

When the geometry measurement system S identifies the geometry of the object to be measured using the luminance values of the pixels affected by the multiple reflections in the above-described manner, the accuracy is decreased. Accordingly, the geometry measurement system S of the present embodiment is characterized in that a pixel that has a high possibility of being affected by the multiple reflection light, and whose reliability is therefore low, is identified and the geometry of the object to be measured is identified without using the luminance value of the identified pixel. Hereinafter, a description will be provided of a method by which the geometry measurement system S identifies a pixel having a high possibility of being affected by the multiple reflection light and a method of identifying the geometry of the object to be measured.

[Types of Projection Patterns]

FIG. 4 contains diagrams showing examples of types of projection patterns to be projected by the projection apparatus 1. The black regions in FIG. 4 represent regions where the projection apparatus 1 does not project light (hereinafter referred to as the "no-projection regions"), and the white regions represent regions where the projection apparatus 1 projects light (hereinafter referred to as the "light-projection regions").

Figure 4A:
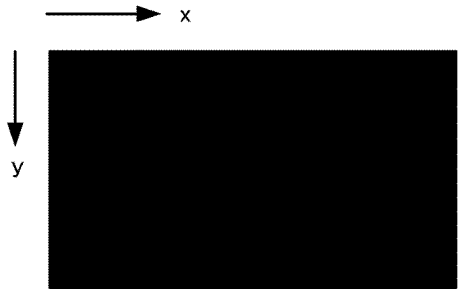
FIG. 4A is a diagram showing an example of types of a projection pattern to be projected by a projection apparatus 1.
Figure 4B:
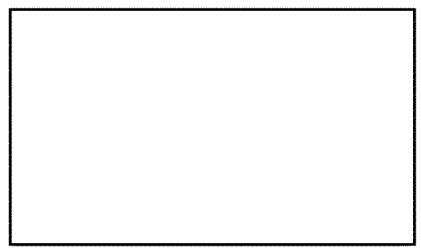
FIG. 4B is a diagram showing an example of types of a projection pattern to be projected by a projection apparatus 1.
Figure 4C:
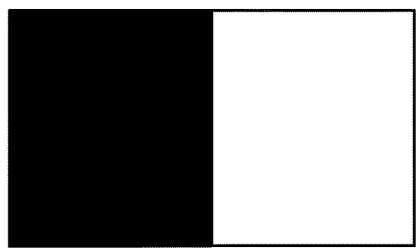
FIG. 4C is a diagram showing an example of types of a projection pattern to be projected by a projection apparatus 1.
Figure 4D:
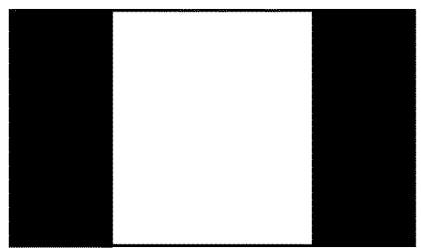
FIG. 4D is a diagram showing an example of types of a projection pattern to be projected by a projection apparatus 1.
Figure 4E:
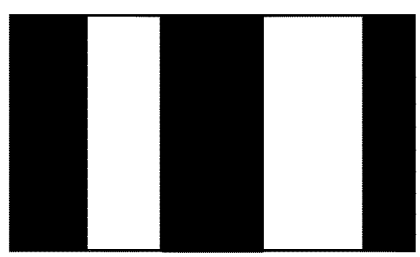
FIG. 4E is a diagram showing an example of types of a projection pattern to be projected by a projection apparatus 1.
Figure 4F:
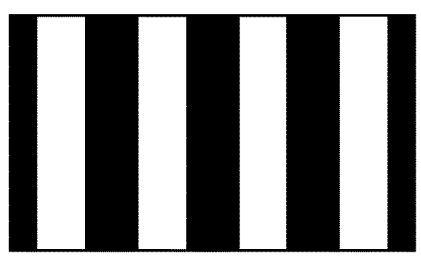
FIG. 4F is a diagram showing an example of types of a projection pattern to be projected by a projection apparatus 1.

FIG. 4A shows a projection pattern by which light is not projected onto any part of the object to be measured (i.e. an all-black pattern). FIG. 4B shows a projection pattern by which light is projected onto the entire object to be measured (i.e. an all-white pattern). FIGS. 4C to 4F show striped projection patterns, which are composed of a light-projection region and a no-projection region and in which the stripes that have a different width for each projection pattern are arranged in the same direction. FIG. 4C shows a projection pattern of pattern number 1, FIG. 4D shows a projection pattern of pattern number 2, FIG. 4E shows a projection pattern of pattern number 3, and FIG. 4F shows a projection pattern of pattern number 4.

Figure 5:
FIG. 5 is a diagram showing examples of Gray codes corresponding to projection patterns of pattern numbers 1 to 4.

The patterns of stripes in the projection patterns shown in FIGS. 4C to 4F correspond to Gray codes. FIG. 5 is a diagram showing examples of Gray codes corresponding to the projection patterns of pattern numbers 1 to 4. By associating 0s in the Gray codes with the no-projection regions and 1s therein with the light-projection regions, the projection patterns shown in FIGS. 4C to 4F are generated.

Each position in the x-direction in FIGS. 4 and 5 is represented by a code value, which is the combination of the numbers 0 or 1 at the respective positions in the Gray codes of pattern numbers 1 to 4. Position 0 in FIG. 5 corresponds to the code value of "0000," position 1 corresponds to the code value of "0001" and position 15 corresponds to the code value of "1000."

The geometry measurement apparatus 3 identifies the code values of the respective pixels based on the luminance values of the respective pixels within four captured images, which are obtained by the projection apparatus 1 projecting, in a sequential manner, the projection patterns from pattern number 1 to pattern number 4 and then by the imaging apparatus 2 imaging under the circumstances where each of the projection patterns is projected. Accordingly, the geometry measurement apparatus 3 can identify which projection pattern is reflected at each pixel position from among the projection patterns toward different orientations. Then, the geometry measurement apparatus 3 can measure the geometry of the object to be measured by identifying the height of each position on the object to be measured by using the principles of triangulation.

For example, when the code value of the pixel at the coordinates (x1, y1) is "0001," the geometry measurement apparatus 3 can identify that the position corresponding to the coordinates (x1, y1) in the object to be measured corresponds to position 1 in FIG. 5. Then, the geometry measurement apparatus 3 can calculate the height of the position corresponding to the coordinates (x1, y1) in the object to be measured based on the distance between the projection apparatus 1 and the imaging apparatus 2 and on the orientation in which the projection apparatus 1 projects light corresponding to position 1. The present embodiment is described with an example using four types of Gray code patterns; however, a measurement resolution of height can be improved by using more Gray codes and thereby narrowing down the widths of the white regions and the black regions.

[Configuration of Geometry Measurement Apparatus 3]

Figure 6:
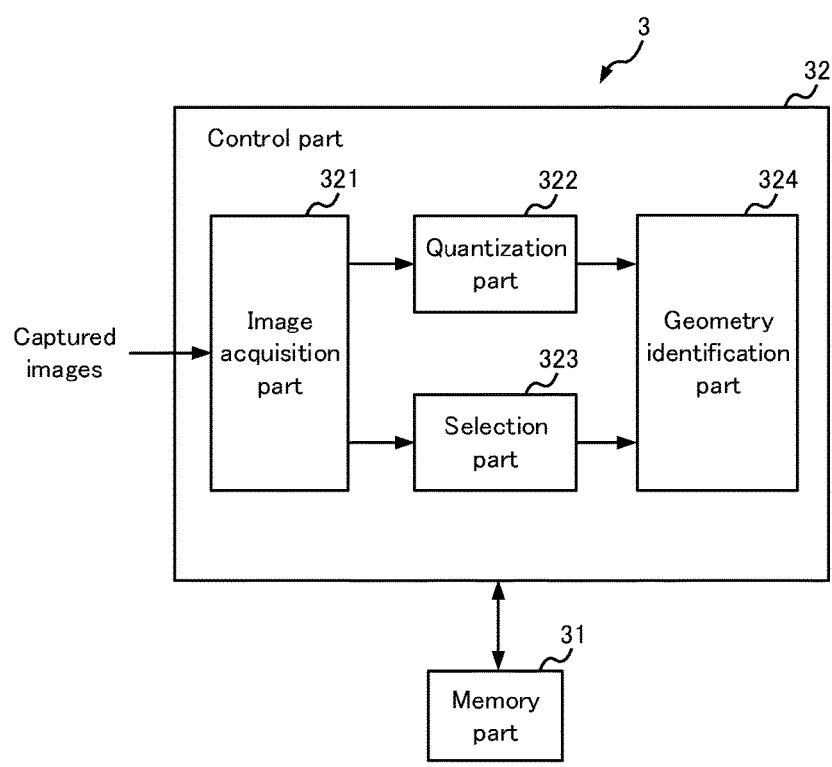
FIG. 6 is a diagram showing the configuration of a geometry measurement apparatus 3.

Next, the configuration and operations of the geometry measurement apparatus 3 will be described in detail. FIG. 6 is a diagram showing the configuration of the geometry measurement apparatus 3. The geometry measurement apparatus 3 includes a memory part 31 and a control part 32. The memory part 31 is a memory medium composed of a read only memory (ROM), a random access memory (RAM), and the like. The memory part 31 stores therein programs to be executed by the control part 32 and various types of data to be used by the control part 32. The memory part 31 stores therein information for identifying height, wherein, in such information, for example, the positions in the projection pattern to be projected by the projection apparatus 1, the coordinates of the respective pixels in the captured image produced by the imaging apparatus 2, and height information indicating height are associated with each other.

The control part 32 is, for example, a central processing unit (CPU). The control part 32 functions as an image acquisition part 321, a quantization part 322, a selection part 323, and a geometry identification part 324 by executing the programs stored in the memory part 31. The control part 32 analyzes the captured image and identifies to which position in the projection pattern each pixel in the captured image corresponds, and then identifies the height of the surface to be measured corresponding to each pixel by referencing the information for identifying height stored in the memory part 31.

The image acquisition part 321 acquires a plurality of captured images, which are generated by the imaging apparatus 2 imaging the object to be measured, onto which a plurality of respectively different pattern light beams are projected in a sequential manner by the projection apparatus 1. In the present embodiment, the image acquisition part 321 acquires four captured images 1 to 4 corresponding to the projection patterns of pattern numbers 1 to 4. The image acquisition part 321 inputs the acquired captured images 1 to 4 into the quantization part 322.

The quantization part 322 generates a quantization value of the luminance value based on the comparison of the luminance value of each pixel from among the plurality of captured images 1 to 4 input from the image acquisition part 321 with a predetermined reference value. In the present embodiment, the quantization part 322 binarizes the luminance value into either 0 or 1. The details of the process in the quantization part 322 will be described below.

Based on the relationship between the luminance values of a plurality of pixels at the same coordinates from among the plurality of captured images 1 to 4 and the reference value, the selection part 323 selects a pixel, whose quantization value is to be used for identification of the geometry of the object to be measured, from among the plurality of pixels. The details of the process by which the selection part 323 selects the pixel will be described below.

The geometry identification part 324 identifies the geometry of the object to be measured based on the quantization values of the pixels selected by the selection part 323. Since the selection part 323 selects the pixels with a relatively small influence from the multiple reflection light, the geometry identification part 324 can identify the geometry of the object to be measured without being significantly affected by the multiple reflection light. Accordingly, the geometry identification part 324 can identify the geometry of the object to be measured with high accuracy.

It should be noted that the projection pattern which is to be used by the geometry identification part 324 for identifying the geometry of the object to be measured is arbitrary. The geometry identification part 324 identifies the geometry of the object to be measured using quantization values which are based on the luminance values of the pixels of a captured image when, for example, a projection pattern for defect detection is projected. Such a projection pattern is used by the selection part 323 for selecting the pixels with a relatively small influence from the multiple reflection light. The projection pattern for defect detection is a projection pattern for detecting pixels affected by the multiple reflection light. The geometry identification part 324 may identify the geometry of the object to be measured using a projection pattern for geometry identification, which is different from the projection pattern for defect detection. In addition, the geometry measurement system S can use any projection pattern as the projection pattern for defect detection. For example, the projection pattern itself is not limited to a stripe pattern, and the geometry measurement system S may use a projection pattern in which white and black luminances are arranged in a random manner. Moreover, the geometry measurement system S may use projection patterns wherein the pattern is the same and only the position thereof is shifted.

[Processing Flow of Geometry Identification]

Figure 7:
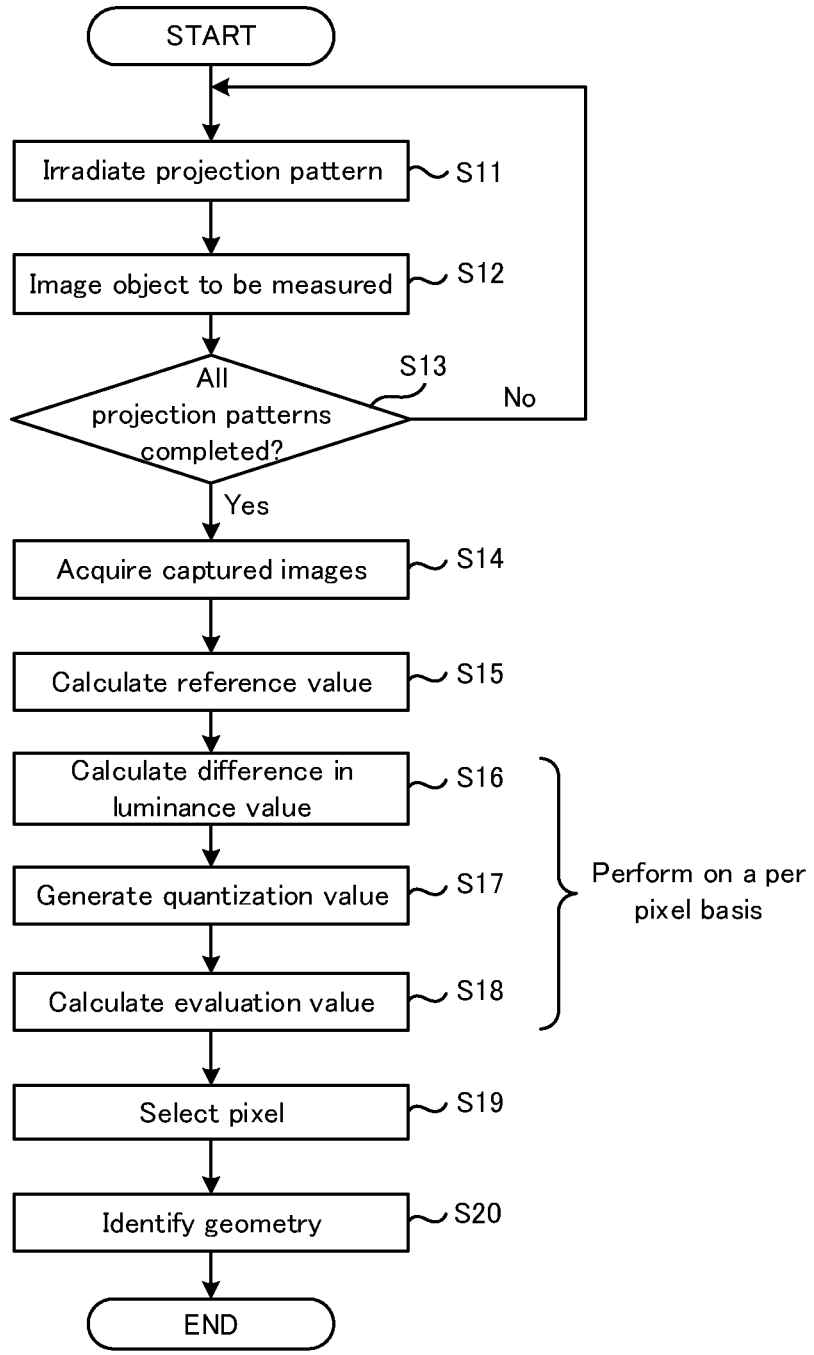
FIG. 7 is a flowchart showing the procedures by which the geometry measurement system S identifies the geometry of the object to be measured.

FIG. 7 is a flowchart showing the procedures by which the geometry measurement system S identifies the geometry of the object to be measured. First, the projection apparatus 1 irradiates, in a sequential manner, the object to be measured with a plurality of projection patterns (S11). The imaging apparatus 2 images the object to be measured in synchronization with the timing of the sequential irradiation of the plurality of projection patterns (S12). Subsequently, a determination is made as to whether the projection apparatus 1 has completed projecting all the projection patterns and whether the imaging apparatus 2 has completed imaging (S13). If it is determined that the projection apparatus 1 has not yet completed projecting all the projection patterns and the imaging apparatus 2 has not yet completed imaging, the procedure returns to step S11. If it is determined that projection of all the projection patterns has been completed and that imaging has been completed, the procedure proceeds to step S14. In this way, the projection apparatus 1 projects, in a sequential manner, the all-black pattern, the all-white pattern, and the projection patterns 1 to 4, and the imaging apparatus 2 generates the plurality of captured images corresponding to the states where the respective projection patterns are irradiated.

Subsequently, the image acquisition part 321 acquires the plurality of captured images from the imaging apparatus 2

(S14). The quantization part 322 generates a quantization value of the luminance value of each pixel from among the plurality of captured images acquired by the image acquisition part 321, and then the selection part 323 selects pixels to be used for the geometry identification during steps S15 to S19.

First, the quantization part 322 calculates an average value of the luminance values of all pixels contained in both the all-black captured image corresponding to the all-black pattern and the all-white captured image corresponding to the all-white pattern. The quantization part 322 sets the calculated average value as the reference value to be used when quantizing (in the present example, binarizing) the luminance values (S15).

Subsequently, the quantization part 322 and the selection part 323 carry out the processing of the following steps S16 to S18 on a per-pixel basis. The quantization part 322 calculates the difference in the luminance value between the corresponding pixels of the all-black captured image and the all-white captured image (S16). Then, the quantization part 322 classifies the plurality of pixels contained in each of the captured images 1 to 4 into the following three (3) groups:
Group 1: Pixels that cannot be used for geometry identification.
Group 2: Pixels with quantization values of 0 corresponding to positions onto which light is not projected.
Group 3: Pixels with quantization values of 1 corresponding to positions onto which light is projected.

The quantization part 322 classifies a pixel having a difference in luminance value between the corresponding pixels of the all-black captured image and the all-white captured image, which is equal to or less than a predetermined threshold, as a pixel in Group 1. It is considered that the pixels included in Group 1 are pixels at which the imaging of the projection pattern with sufficient luminance was unsuccessful, or that they are pixels of the shade regions to which light from the projection apparatus 1 fails to reach, due to the influence of the reflectance and the orientation of the surface to be measured, and that the reliability thereof is low. Accordingly, the quantization part 322 does not generate quantization values for the pixels included in Group 1.

The quantization part 322 classifies a pixel as a pixel in Group 2 when the difference in the luminance value between the corresponding pixels of the all-black captured image and the all-white captured image is larger than the predetermined threshold and when the luminance value of the pixel, which is the target of the classification, is smaller than the reference value. In addition, the quantization part 322 classifies a pixel as a pixel in Group 3 when the difference in luminance value between the corresponding pixels of the all-black captured image and the all-white captured image is larger than the predetermined threshold and when the luminance value of the pixel, which is the target of the classification, is equal to or larger than the reference value. The quantization part 322 can determine the quantization value of each pixel of each of the captured images 1 to 4 by classifying all pixels contained in all captured images 1 to 4 into the above-described three groups (S17).

When the projection apparatus 1 projects the projection patterns 1 to 4 and when it is assumed that a quantization value of a pixel (x, y) in a captured image i corresponding to a projection pattern i (wherein, i is an integer between 1 and 4) is $c_i$, the quantization values $c_1$, $c_2$, $c_3$ and $c_4$ corresponding to the pixel (x, y) are obtained. The memory part of the geometry measurement apparatus 3 stores orientations in which the projection apparatus 1 projects the projection patterns 1 to 4. The geometry measurement apparatus 3 can identify in which orientation the light is projected from the projection apparatus 1 at the position where the quantization value in the projection pattern of pattern number 1 is $c_1$, the quantization value in the projection pattern of pattern number 2 is $c_2$, the quantization value in the projection pattern of pattern number 3 is $c_3$, and the quantization value in the projection pattern of pattern number 4 is $c_4$. Accordingly, information combining $c_1$, $c_2$, $c_3$, and $c_4$ can be used as positional information indicating which region in the projection pattern is projected at the pixel (x, y). Thus, the quantization part 322 generates a code value $C=(c_1, c_2, c_3, c_4)$ as the information indicating the position of the pixel (x, y), and causes the memory part 31 to store the code value in association with the coordinates of the pixel (x, y).

Subsequently, the selection part 323 selects pixels that are less likely to be affected by the multiple reflections, and thus have a high reliability, and that can be used for geometry identification of the object to be measured based on the difference value between the luminance value of the plurality of pixels included in the plurality of captured images 1 to 4 and the reference value. While the luminance value of a pixel which is unaffected by the multiple reflection light is considered to have a value close to either the maximum luminance value or the minimum luminance value, the luminance of a pixel which is affected by the multiple reflection light is considered likely to have a value that has a large difference from either the maximum luminance value or the minimum luminance value and that is close to the reference value.

Accordingly, the selection part 323 calculates an evaluation value for evaluating the reliability of the luminance value of each pixel based on the difference value between the luminance value of each pixel in the plurality of captured images 1 to 4 and the reference value (S18). The selection part 323 calculates the evaluation value by, for example, dividing the difference value by a black-white difference value, which is the difference between the luminance value of the all-black captured image, which is taken by the imaging apparatus when light is not projected onto the object to be measured, and the luminance value of the all-white captured image, which is taken by the imaging apparatus when light is projected onto the entire object to be measured. For pixels with a quantization value of 1, as set by the quantization part 322, the selection part 323 calculates the evaluation value by dividing an absolute value or square value of a value, which is obtained by subtracting the reference value from the luminance value, by the black-white difference value. In addition, for pixels with a quantization value of 0, as set by the quantization part 322, the selection part 323 calculates the evaluation value by dividing a value, which is obtained by subtracting the luminance value from the reference value, by the black-white difference value. When there is an influence of the multiple reflection light, the black-white difference value tends to become larger, and thus the selection part 323 can lower the evaluation value when the black-white difference value becomes large by dividing the difference value by the black-white difference value.

Subsequently, the selection part 323 selects, as a pixel to be used for identifying the geometry of the object to be measured, a pixel which has an average value larger than a predetermined threshold. Such an average value is an average value of the evaluation values generated by dividing each of the difference values corresponding to the plurality of pixels by the black-white difference value (S19). The average value is a number that represents the pixel reliability. The selection part 323 notifies the geometry identification part 324 about the information for identifying the thus-selected pixels in association with code values.

Subsequently, the geometry identification part 324 identifies the position in the projection pattern projected onto each pixel, based on the code value of each pixel notified by the selection part 323. Then, the geometry identification part 324 identifies the geometry of the object to be measured by calculating the height of each pixel based on the coordinates (x, y) of each pixel, the position in the projection pattern and the information for identifying height stored in the memory part 31 (S20).

It should be noted that the control part 32 may carry out the processing of steps S18 and S19 in FIG. 7 in parallel with the processing of steps S16 and S17. Alternatively, the control part 32 may carry out the processing of steps S18 and S19 prior to the processing of steps S16 and S17.

The selection part 323 may calculate the average value after excluding, from the luminance values to be used for calculating the average value, the luminance value of a pixel whose luminance value is closest to the reference value, among the pixels included in the plurality of captured images 1 to 4. The selection part 323 may exclude, from the luminance values to be used for calculating the average value, the luminance value of the pixel closest to a boundary position of the stripes in the striped projection pattern among of the pixels included in the plurality of captured images 1 to 4. The selection part 323 may exclude, from the luminance values to be used for calculating the average value, the luminance value of the pixel that corresponds to the boundary position between the region of the projection pattern where light is projected and the region thereof where light is not projected, as the luminance value closest to the reference value, among the luminance values of the pixels included in the plurality of captured images 1 to 4. This is because the luminance values of the pixels that correspond to the boundary positions of the stripes may have values close to the reference value even when they are not affected by the multiple reflection light, and thus the determination accuracy of the pixel reliability decreases if these luminance values were used for calculating the average value.

As a summary of the above description, the geometry measurement system S can calculate the pixel reliability from the following expression:

$$P(i, j) = \frac{1}{I(i, j)K'} \sum_{k=1}^{K} \alpha_k |p_r(i, j) - p_m(i, j, k)|$$

wherein (i, j) denotes a pixel position, I(i, j) denotes a black-white difference value, $\alpha_k$ denotes a weight coefficient (for example, 0 to 1), k denotes the pattern number, $p_r(i, j)$, denotes the reference value, $p_m(i, j, k)$ denotes a measurement value, K denotes the number of projection patterns, and K' denotes the number of projection patterns to be used for calculating the reliability. It should be noted that, for k values that render the minimum absolute value of $p_r(i, j)-p_m(i, j, k)$, addition is not performed. For example, if a projection pattern is a four-bit Gray code, four patterns (K=4) are projected; however, one pattern is removed in order to reduce the influence of the boundary parts, and thus K'=3.

Figure 8:
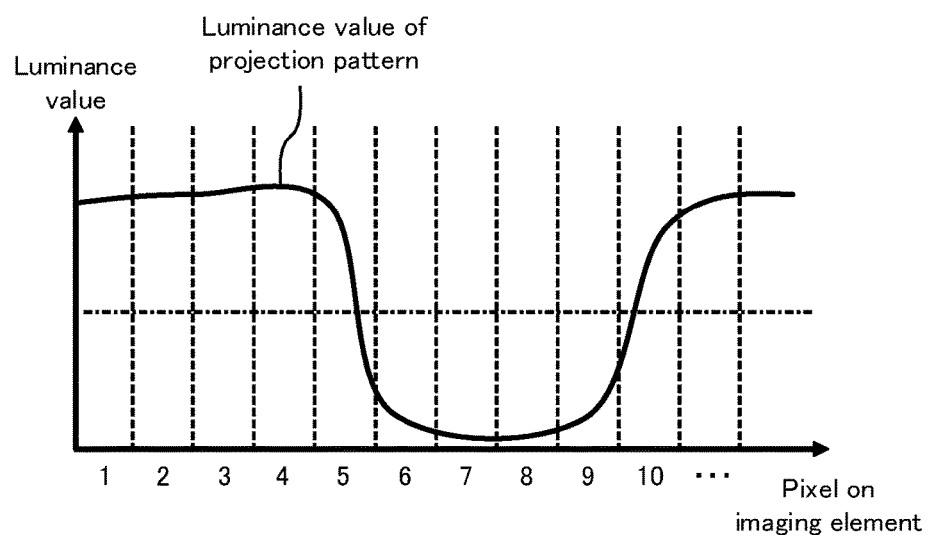
FIG. 8 is a diagram schematically showing the luminance values at boundary positions of stripes in the projection pattern.

FIG. 8 is a graph schematically showing the luminance values at the boundary positions of the stripes in the projection pattern. In FIG. 8, the luminance value changes at pixel 5 and pixel 10. When Gray codes are used for the projection patterns, since there is only one projection pattern where each pixel corresponds to the boundary position of the stripes, the selection part 323 can still make use of information of a sufficient number of pixels even when the pixels corresponding to the boundary positions are removed.

Moreover, instead of selecting pixels for which the average value of the evaluation values is larger than the predetermined threshold, the selection part 323 may select pixels for which the minimum value of the evaluation values is larger than the predetermined threshold from among the pixels for which evaluation values are calculated for the plurality of captured images 1 to 4, as the pixels to be used for identification of the geometry of the object to be measured. In this way, the selection part 323 can avoid selecting the pixels that have a high possibility of being strongly affected by the multiple reflections in a particular projection, while the average value is larger than the predetermined threshold. The selection part 323 may select pixels by making use of both the average value and the minimum value of the evaluation values in order to increase the accuracy of selection. Moreover, the selection part 323 may select pixels by making use of standard deviation or the like.

Furthermore, the selection part 323 may calculate the average value by weighting the difference value between the luminance value and the reference value for the plurality of pixels based on the frequency of the projection pattern. When the width of the stripe in a projection pattern is narrow, and thus the projection pattern includes a high frequency component, an error is prone to occur due to smaller amplitude of image signals input into the imaging elements or a higher occurrence frequency of the boundary portions, which are both affected by the transmission characteristics or the like of the projection optical system or imaging optical system. Accordingly, the determination accuracy of the reliability is decreased.

Therefore, the selection part 323 can improve the determination accuracy of the pixel reliability by making the weight coefficient for the difference value of the captured image (for example, the captured image 1) corresponding to a low-frequency pattern of the projection pattern be larger than the weight coefficient for the difference value of the captured image (for example, the captured image 4) corresponding to a high-frequency pattern of the projection pattern, and then by calculating the average value. It should be noted that a weight coefficient may assume a value between, for example, 0 and 1. Some projection patterns may have a weight coefficient of 0 so as not to be included in the determination of the reliability.

Embodiment

FIG. 9 contains diagrams showing the relationship between a luminance value and a quantization value of a pixel (x, y) in a captured image. The horizontal axis indicates the projection pattern types and the vertical axis indicates the luminance value in the captured image. Solid-line arrows indicate the luminance values attributed to direct light and broken-line arrows indicate the luminance values attributed to the multiple reflection light. For the projection patterns where the solid-line arrows exist, light is projected onto the pixel (x, y). For the projection patterns where the broken-line arrows exist, light is not projected onto the pixel (x, y). Accordingly, light is projected onto the pixel (x, y) only in projection patterns 1, 2 and 4, and if there is no influence of the multiple reflection light, the code value for this pixel (x, y) is C=(c1, c2, c3, c4)=(1, 1, 0, 1).

Figure 9A:
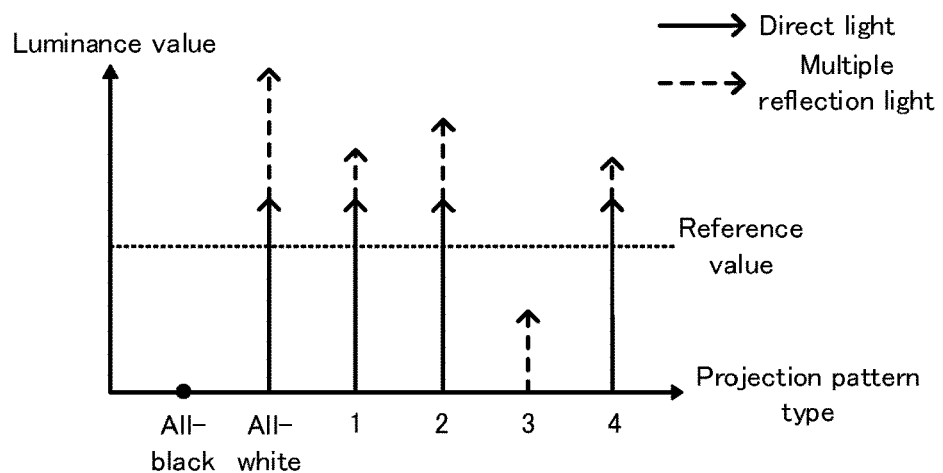
FIG. 9A is a diagram showing the relationship between a luminance value and a quantization value at a pixel (x, y) in the captured image.
Figure 9B:
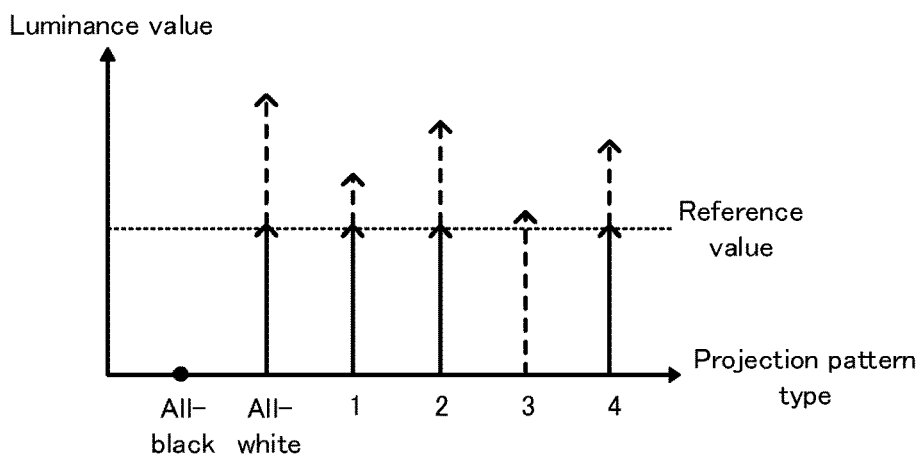
FIG. 9B is a diagram showing the relationship between a luminance value and a quantization value at a pixel (x, y) in the captured image.

In FIG. 9A, the quantization values after the multiple reflection light is added are also (1, 1, 0, 1). However, in FIG. 9B, in projection pattern 3, despite the fact that light is not projected onto the pixel (x, y), the luminance value exceeds the reference value due to the influence of the multiple reflection light, and thus the quantization value is determined to be 1. Even in such a case, selection part 323 in the geometry measurement apparatus 3 of the present embodiment does not select this pixel (x, y) when the difference between the luminance value and the reference value in the projection pattern 3 is small and when the average value of the evaluation values of all the projection patterns is smaller than the threshold. Accordingly, the geometry identification part 324 can be prevented from using the pixel (x, y) that has been affected by the multiple reflection light for identifying the geometry.

Figure 9C:
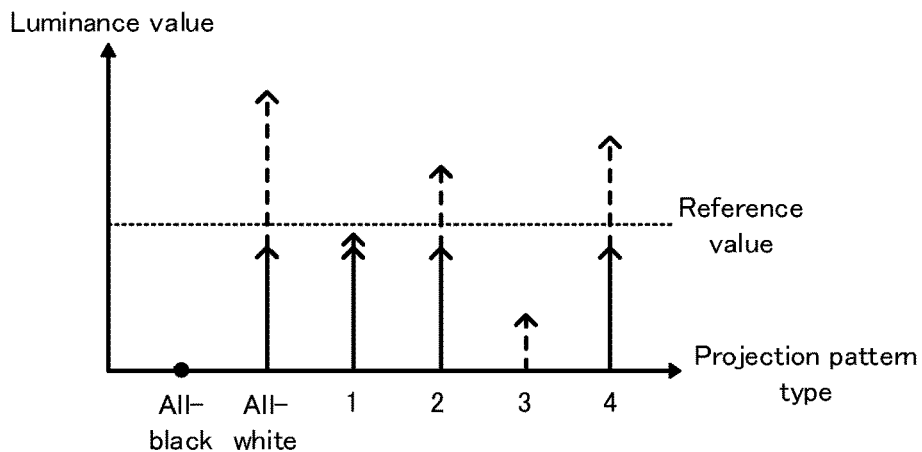
FIG. 9C is a diagram showing the relationship between a luminance value and a quantization value at a pixel (x, y) in the captured image.

In FIG. 9C, due to a large influence of the multiple reflection light at the time of projecting an all-white pattern, a large reference value has been set with respect to the luminance values when light is projected in the projection patterns 1 to 4. As a consequence, in the projection pattern 1, even though light is projected onto the pixel (x, y), the luminance value after the multiple reflection light is added is below the reference value, and thus the quantization value is determined to be 0. Even in such a case, however, the selection part 323 does not select this pixel (x, y) when the average value of the evaluation values of all the projection patterns is smaller than the threshold. Accordingly, the geometry identification part 324 is prevented from using the pixel (x, y) that has been affected by the multiple reflection light for identifying the geometry.

Variation Example 1

In the description above, the quantization part 322 sets, as the reference value, an intermediate luminance value between the luminance value of an all-black captured image (first captured image) imaged by the imaging apparatus 2 under the circumstances where light is not projected onto the object to be measured and the luminance value of an all-white captured image (second captured image) imaged by the imaging apparatus 2 under the circumstances where light is projected onto the entire object to be measured. However, the reference value may be any other value. The luminance value of the captured image imaged by the imaging apparatus 2 under the circumstances where light is projected onto the entire object to be measured tends to be larger than the luminance value of the captured image imaged under the circumstances where the projection patterns 1 to 4 are projected onto the object to be measured. Accordingly, when quantizing the luminance value of the captured image imaged under the circumstances where the projection patterns 1 to 4 are projected on to the object to be measured, the quantization part 322 may set the reference value to a value that is smaller than the intermediate luminance value between the luminance value of the all-black captured image and the luminance value of the all-white captured image. For example, the quantization part 322 may set, as the reference value, a value that is 80 to 90% of the intermediate luminance value.

Variation Example 2

The geometry measurement system S may make a plurality of measurements after changing the conditions under which the projection apparatus 1 projects the projection patterns and may then identify the geometry of the object to be measured based on the measurement results. In such a case, the projection apparatus 1 changes any one of, for example, the "orientation," "position," or "intensity distribution geometry of the projection pattern" of a projection pattern group, which consists of the plurality of projection patterns, and then sequentially project the projection patterns included in a plurality of projection pattern groups. Here, changing the "intensity distribution geometry of the projection pattern" means to change any parameters related to the intensity distribution, for example, the pattern shape, the pattern period, the amplitude distribution, or the like. The imaging apparatus 2 generates a plurality of captured image groups corresponding to a plurality of projection pattern groups. A captured image group includes a plurality of captured images. Here, a single projection pattern group includes a plurality of different projection patterns, which are projected under the same conditions, as with the projection patterns 1 to 4 in the description above. A single captured image group includes a plurality of different captured images, which are imaged under the same conditions, as with the captured images 1 to 4 in the description above.

The influence of the multiple reflections also changes when the conditions under which the projection apparatus 1 projects the projection pattern are changed. Therefore, the geometry measurement system S may determine, on a per pixel basis, the reliability of the quantization value identified using a first projection pattern group and the reliability of the quantization value identified using a second projection pattern group, and may then identify the geometry of the object to be measured using the quantization value corresponding to a higher degree of reliability.

In such a case, the image acquisition part 321 acquires a plurality of captured image groups, in which the object to be measured is imaged after being projected by a plurality of projection pattern groups, each group being projected with a different condition. The quantization part 322 generates a quantization value of the luminance value of each pixel of the plurality of captured images included in each of the plurality of captured image groups. Then, the selection part 323 determines the reliability of the selected pixel, based on the luminance values of the plurality of pixels, in association with the plurality of captured image groups. The geometry identification part 324 identifies the geometry of the object to be measured based on the quantization values corresponding to the pixels included in the captured image group selected from among the plurality of captured image groups based on the reliability determined by the selection part 323. For example, the geometry identification part 324 may determine the geometry of the object to be measured by using the quantization values whose value indicating the reliability exceeds a predetermined threshold, or using the quantization values whose value indicating the reliability is high, from among the plurality of quantization values. At this time, the geometry identification part 324 may use the result obtained by synthesizing calculated average values of the geometries corresponding to the quantization values whose value indicating the reliability exceeds the predetermined threshold, and may use the geometry corresponding to the quantization value with the highest degree of reliability. In addition, if the reliability changes significantly, the relevant pixel does not need to be used as the geometry measurement result. Further, the geometry identification part 324 does not need to use the relevant pixel as the geometry measurement result if the reliability value fails to exceed the predetermined value under all conditions.

In such a manner, the geometry measurement system S can identify the geometry of the object to be measured, on a per pixel basis, using quantization values with a higher degree of reliability from among the quantization values based on the captured images generated under the circumstances where each of the plurality of projection pattern groups is projected, and thus the reliability of the measurement result can be improved. In addition, even when a region of part of the object to be measured cannot be measured with one projection pattern set, the geometry measurement system S may still be able to make a measurement by using another projection pattern set, and thus the measurable region can be expanded.

Variation Example 3

In the geometry measurement system S, a plurality of imaging apparatuses 2, being installed at a position and an angle different from each other, may be used to image the object to be measured on which the projection patterns are projected. In such a case, light projected from the projection apparatus 1 reflects from the surface to be measured and enters into each of the imaging apparatuses 2. Since the light beams having a different reflection path for each imaging apparatus 2 are incident, the influence of the multiple reflections is different for each captured image generated by both imaging apparatuses 2, even for the pixels at the same position in the surface to be measured.

Accordingly, the geometry measurement system S may identify the geometry of the object to be measured based on the luminance values, which are based on the plurality of captured image groups generated by each of the imaging apparatuses 2. The geometry measurement system S selects pixels with a high degree of reliability by following the procedure described with the flowchart in FIG. 7, based on the plurality of captured image groups generated by each of the imaging apparatuses 2. Then, when the selection part 323 selects a plurality of pixels which are determined to be corresponding to the same position of the object to be measured, from among the plurality of captured image groups, the selection part 323 selects pixels with a higher degree of reliability from among the plurality of pixels selected from among the plurality of captured image groups. Then, the geometry identification part 324 identifies the geometry of the object to be measured by using the quantization values of the selected pixels.

At this time, the geometry identification part 324 may use the result obtained by synthesizing calculated average values of the geometries corresponding to the quantization values whose degree of reliability exceeds the predetermined threshold, and may use the geometry corresponding to the quantization value with the highest degree of reliability. In addition, if the reliability for the pixels at the same position changes significantly when measurements are made by making use of each of the captured images imaged from different directions, the geometry identification part 324 does not need to use the relevant pixel to identify the geometry. Further, the geometry identification part 324 does not need to use the relevant pixel as the geometry measurement result if the reliability values in all measurement directions fail to exceed the predetermined value.

It should be noted that, instead of using a plurality of imaging apparatuses 2, the geometry measurement system S may use a plurality of projection apparatuses 1, being installed at a position and an angle different from each other, and may perform similar processes. In addition, the geometry measurement system S may be provided with, for example, a turntable on to which the object to be measured is to be mounted. While the turntable is being turned, the projection apparatus 1 may project the projection patterns onto the object to be measured from different directions. The imaging apparatus 2 may generate a plurality of captured image groups corresponding to the circumstances in which the projection patterns are projected from the respective directions. As described above, even when there are pixels with low-reliability luminance values among the captured images included in one captured image group, the geometry measurement system S can still compensate for such low reliability with the luminance values of the captured images included in other captured image groups by making use of a plurality of captured image groups, and thus the measurement accuracy is improved.

Variation Example 4

The geometry measurement system S may combine the projection patterns used in the description above with a phase shifting method involving sinusoidal luminance distributions so as to obtain multi-valued luminance of the projection patterns, and thus the resolution in the height direction may be further improved. In this case, an offset value of the sinusoidal waves according to the phase shifting method may be set as the reference value and the amplitude of the sinusoidal waves may be used instead of the black-white difference value for division.

Effect of the Present Embodiment

As described above, in the geometry measurement system S according to the present embodiment, based on the relationship between the reference value and the luminance value for a plurality of pixels having the same coordinates in the plurality of captured images obtained by the projection apparatus 1 projecting, onto the object to be measured, light of a plurality of respectively different projection patterns, the selection part 323 selects pixels, from among the plurality of pixels, having quantization values to be used for identifying the geometry of the object to be measured. Then, the geometry identification part 324 identifies the geometry of the object to be measured by using the pixels selected by the selection part 323. In this way, the influence of the multiple reflection light can be suppressed, and thus the accuracy of geometry measurement can be improved.

In addition, the projection apparatus 1 sequentially projects, onto the object to be measured, patterns with a plurality of stripes which each have a different width for each projection pattern and which are arranged in the same direction, and thus the projection apparatus 1 can adjust the resolution in the height direction based on the width of the stripes. Moreover, a pattern with the stripes corresponds to a Gray code, and thus the number of stripe patterns where one pixel corresponds to the boundary position of the stripes is limited to one (1), among the plurality of stripe patterns, and thus it is less subject to the influence of the boundary position.

The selection part 323 selects pixels to be used for identifying the geometry of the object to be measured based on the difference value between the luminance value and the reference value for the plurality of pixels. In this way, it is possible to avoid using the pixels which have the luminance value close to the reference value due to being affected by the multiple reflection light, for the geometry measurement of the object to be measured, and thus the accuracy in geometry measurement is improved.

Moreover, the selection part 323 selects, as the pixels to be used for identifying the geometry of the object to be measured, pixels which have an average value larger than a predetermined threshold. Such an average value is an average value of the evaluation values generated by dividing each of the difference values corresponding to the plurality of pixels by the black-white difference value. In this way, the average value of the evaluation values becomes small when the reference value is becoming too large due to being affected by the multiple reflection light, and thus it is possible to avoid using the pixels which are affected by the multiple reflection light for the geometry measurement of the object to be measured, and thus the accuracy in geometry measurement is improved.

Further, the selection part 323 excludes, from the luminance values to be used for calculating the average value, the luminance value of the pixel whose luminance value is closest to the reference value from among the luminance values of the pixels included in the plurality of captured images. In this way, the luminance value of the pixel corresponding to the boundary position of the stripes in the projection pattern has no influence, and thus the accuracy in geometry measurement is improved.

As noted above, the present invention is described using embodiments thereof; however, the technical scope of the present invention is not limited to the scope described in the embodiments above. It is apparent to those skilled in the art that various variations or modifications can be made to the embodiments above. It is clear from the descriptions in the claims that embodiments with such variations or modifications also fall within the technical scope of the present invention. For example, in the description above, the quantization part 322 binarizes the luminance value to either 0 or 1; however, the quantization part 322 may quantize the luminance value using three or more values.

What is claimed is:

1. A geometry measurement system comprising:
a projection apparatus that projects light of a plurality of respectively different projection patterns onto an object to be measured;
an imaging apparatus that generates a plurality of captured images by sequentially imaging the object to be measured while the projection apparatus projects each of the plurality of projection patterns; and
a geometry measurement apparatus that measures the geometry of the object to be measured based on the plurality of captured images, wherein
the geometry measurement apparatus includes:
an image acquisition part that acquires the plurality of captured images;
a quantization part that generates a quantization value of a luminance value for each pixel in the plurality of captured images by comparing the luminance value with a predetermined reference value;
a selection part that selects, based on the relationship between the reference value and the luminance value for a plurality of pixels having the same coordinates in the plurality of captured images, a pixel whose quantization value is to be used for identifying the geometry of the object to be measured, from among the plurality of pixels; and
a geometry identification part that identifies the geometry of the object to be measured based on the quantization value of the pixel selected by the selection part, wherein
the selection part obtains reliability determined on the basis of a plurality of evaluation values calculated by using relationship between (i) each of difference values that shows a difference between the luminance value for each of the plurality of pixels and the reference value and (ii) a black-white difference value that shows a difference between a luminance value of an image, which is imaged by the imaging apparatus under circumstances where light is not projected onto the object to be measured, and a luminance value of an image, which is imaged by the imaging apparatus under circumstances where light is projected onto the entire object to be measured, and selects a pixel to be used for identifying the geometry of the object to be measured whose reliability satisfies a predetermined condition.

2. The geometry measurement system according to claim 1, wherein
the projection apparatus sequentially projects, onto the object to be measured, the plurality of projection patterns, in which stripes that have a different width for each projection pattern and that are composed of a light-projection region and a no-projection region are arranged in the same direction.

3. The geometry measurement system according to claim 2, wherein
the projection apparatus sequentially projects, onto the object to be measured, the plurality of projection patterns, in which a pattern of the stripes corresponds to a Gray code.

4. The geometry measurement system according to claim 1, wherein
the selection part calculates, as the reliability, (i) an average value, (ii) a minimum value, or (iii) a standard deviation of a plurality of evaluation values generated by dividing each of the difference values corresponding to the plurality of pixels by a black-white difference value, the black-white difference value being a difference between a luminance value of an all-black captured image, which is imaged by the imaging apparatus under circumstances where light is not projected onto the object to be measured, and a luminance value of an all-white captured image, which is imaged by the imaging apparatus under circumstances where light is projected onto the entire object to be measured, and selects, as the pixels to be used for identifying the geometry of the object to be measured, pixels whose reliability satisfies a predetermined condition.

5. The geometry measurement system according to claim 1, wherein
the selection part calculates, as the reliability, an average value of a plurality of evaluation values generated by dividing each of the difference values corresponding to the plurality of pixels by a black-white difference value, the black-white difference value being a difference between a luminance value of an all-black captured image, which is imaged by the imaging apparatus under circumstances where light is not projected onto the object to be measured, and a luminance value of an all-white captured image, which is imaged by the imaging apparatus under circumstances where light is projected onto the entire object to be measured, and selects, as the pixel to be used for identifying the geometry of the object to be measured, pixels whose reliability is larger than a predetermined threshold.

6. The geometry measurement system according to claim 1, wherein
the selection part excludes, from the luminance values to be used for calculating the reliability, the luminance value of a pixel whose luminance value is closest to the reference value, among the pixels included in the plurality of captured images.

7. The geometry measurement system according to claim 1, wherein
the selection part excludes, from the luminance values to be used for calculating the reliability, the luminance value of the pixel closest to a boundary position of the stripes in the striped projection pattern among of the pixels included in the plurality of captured images.

8. The geometry measurement system according to claim 1, wherein
the selection part excludes, from the luminance values to be used for calculating the reliability, the luminance value corresponding to the pixel that corresponds to a boundary position between a region onto which light is projected and a region onto which light is not projected among the pixels included in the plurality of captured images.

9. The geometry measurement system according to claim 1, wherein
the selection part calculates the reliability by weighting the difference values based on a frequency of the projection pattern.

10. The geometry measurement system according to claim 9, wherein
the selection part calculates the reliability by making a weight coefficient for the difference value of the captured image corresponding to a low-frequency pattern of the projection pattern be larger than a weight coefficient for the difference value of the captured image corresponding to a high-frequency pattern of the projection pattern.

11. The geometry measurement system according to claim 1, wherein
the quantization part generates the quantization value by comparing the luminance value of each pixel in the plurality of captured images with the reference value, the reference value corresponding to an intermediate luminance value between a luminance value of a first captured image imaged by the imaging apparatus under circumstances where light is not projected onto the object to be measured and a luminance value of a second captured image imaged by the imaging apparatus under circumstances where light is projected onto the entire object to be measured.

12. The geometry measurement system according to claim 1, wherein
the image acquisition part acquires a plurality of captured image groups, in which the object to be measured is imaged while being projected by a plurality of projection pattern groups respectively with different conditions, each group including the plurality of projection patterns,
the quantization part generates a quantization value of a luminance value for each pixel in the plurality of captured images, the plurality of captured images being included in each of the plurality of captured image groups,
the selection part determines reliability of the selected pixel in association with the plurality of captured image groups based on the luminance values of the plurality of pixels, and
the geometry identification part identifies the geometry of the object to be measured based on the quantization value corresponding to the pixel included in a captured image group selected from the plurality of captured image groups based on the reliability.

13. The geometry measurement system according to claim 12, wherein
the geometry identification part identifies the geometry of the object to be measured based on a result obtained by synthesizing average values of the quantization values whose value indicating the reliability exceeds a predetermined threshold.

14. The geometry measurement system according to claim 12, wherein
when the reliability for pixels at the same position differs by an amount equal to or more than a predetermined magnitude, in each of the plurality of captured images imaged from a plurality of different directions, the geometry identification part does not use such pixels for identifying the geometry of the object to be measured.

15. The geometry measurement system according to claim 1, wherein
the geometry identification part identifies the geometry of the object to be measured by making use of the quantization value based on the luminance value of each pixel in the captured image used by the selection part for selecting the pixel to be used for identifying the geometry of the object to be measured.

16. The geometry measurement system according to claim 1, wherein
the geometry identification part identifies the geometry of the object to be measured by making use of the quantization value based on the luminance value of each pixel in a second captured image, which differs from a first captured image used by the selection part for selecting the pixel to be used for identifying the geometry of the object to be measured, and which is imaged during projection of a projection pattern for geometry identification.

17. A geometry measurement apparatus, comprising:
an image acquisition part that acquires a plurality of captured images generated by imaging an object to be measured, onto which a plurality of respectively different projection patterns are sequentially projected;
a quantization part that generates a quantization value of a luminance value for each pixel in the plurality of captured images by comparing the luminance value with a predetermined reference value;
a selection part that selects, based on the relationship between the reference value and the luminance value for a plurality of pixels having the same coordinates in the plurality of captured images, a pixel whose quantization value is to be used for identifying the geometry of the object to be measured, from among the plurality of pixels; and
a geometry identification part that identifies the geometry of the object to be measured based on the quantization value of the pixel selected by the selection part, wherein
the selection part obtains reliability determined on the basis of a plurality of evaluation values calculated by using relationship between (i) each of difference values that shows a difference between the luminance value for each of the plurality of pixels and the reference value and (ii) a black-white difference value that shows a difference between a luminance value of an image, which is imaged by the imaging apparatus under circumstances where light is not projected onto the object to be measured, and a luminance value of an image, which is imaged by the imaging apparatus under circumstances where light is projected onto the entire object to be measured, and selects a pixel to be used for identifying the geometry of the object to be measured whose reliability satisfies a predetermined condition.

18. A method for geometry identification, comprising:

a step, performed by a projection apparatus, of projecting light of a plurality of respectively different projection patterns onto an object to be measured;

a step, performed by an imaging apparatus, of generating a plurality of captured images by sequentially imaging the object to be measured while each of the plurality of projection patterns is projected;

a step, performed by a computer, of acquiring the plurality of captured images;

a step, performed by the computer, of generating a quantization value of a luminance value for each pixel in the plurality of captured images by comparing the luminance value with a predetermined reference value;

a step, performed by the computer, of selecting, based on the relationship between the reference value and the luminance value for a plurality of pixels having the same coordinates in the plurality of captured images, a pixel whose quantization value is to be used for identifying the geometry of the object to be measured, from among the plurality of pixels; and a step, performed by the computer, of identifying the geometry of the object to be measured based on the quantization value of the selected pixel, wherein the step of selecting comprises:

obtaining reliability determined on the basis of a plurality of evaluation values calculated by using relationship between (i) each of difference values that shows a difference between the luminance value for each of the plurality of pixels and the reference value and (ii) a black-white difference value that shows a difference between a luminance value of an image, which is imaged by the imaging apparatus under circumstances where light is not projected onto the object to be measured, and a luminance value of an image, which is imaged by the imaging apparatus under circumstances where light is projected onto the entire object to be measured; and selecting a pixel to be used for identifying the geometry of the object to be measured whose reliability satisfies a predetermined condition.

* * * * *